United States Patent Office 3,320,745
Patented May 23, 1967

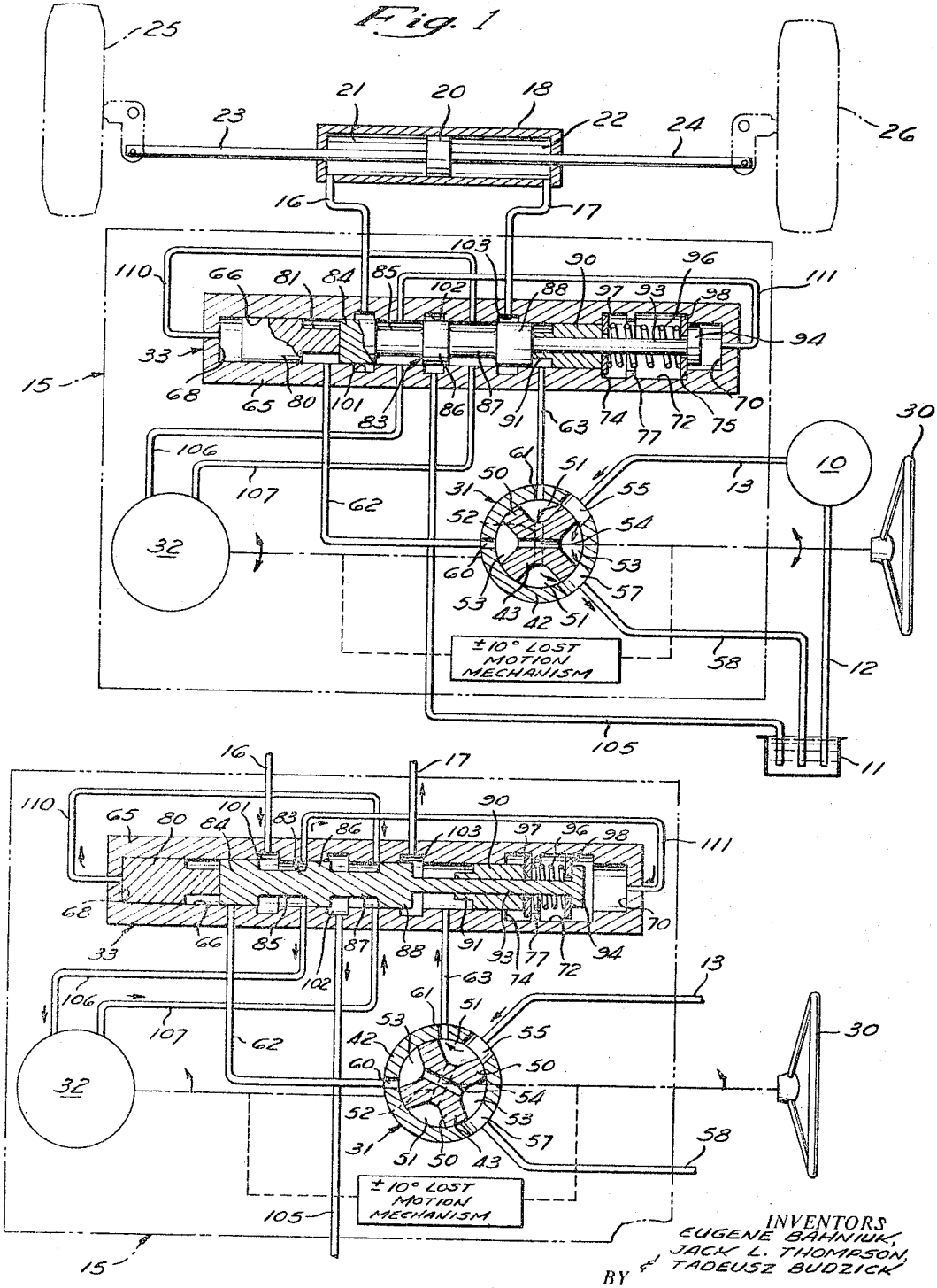

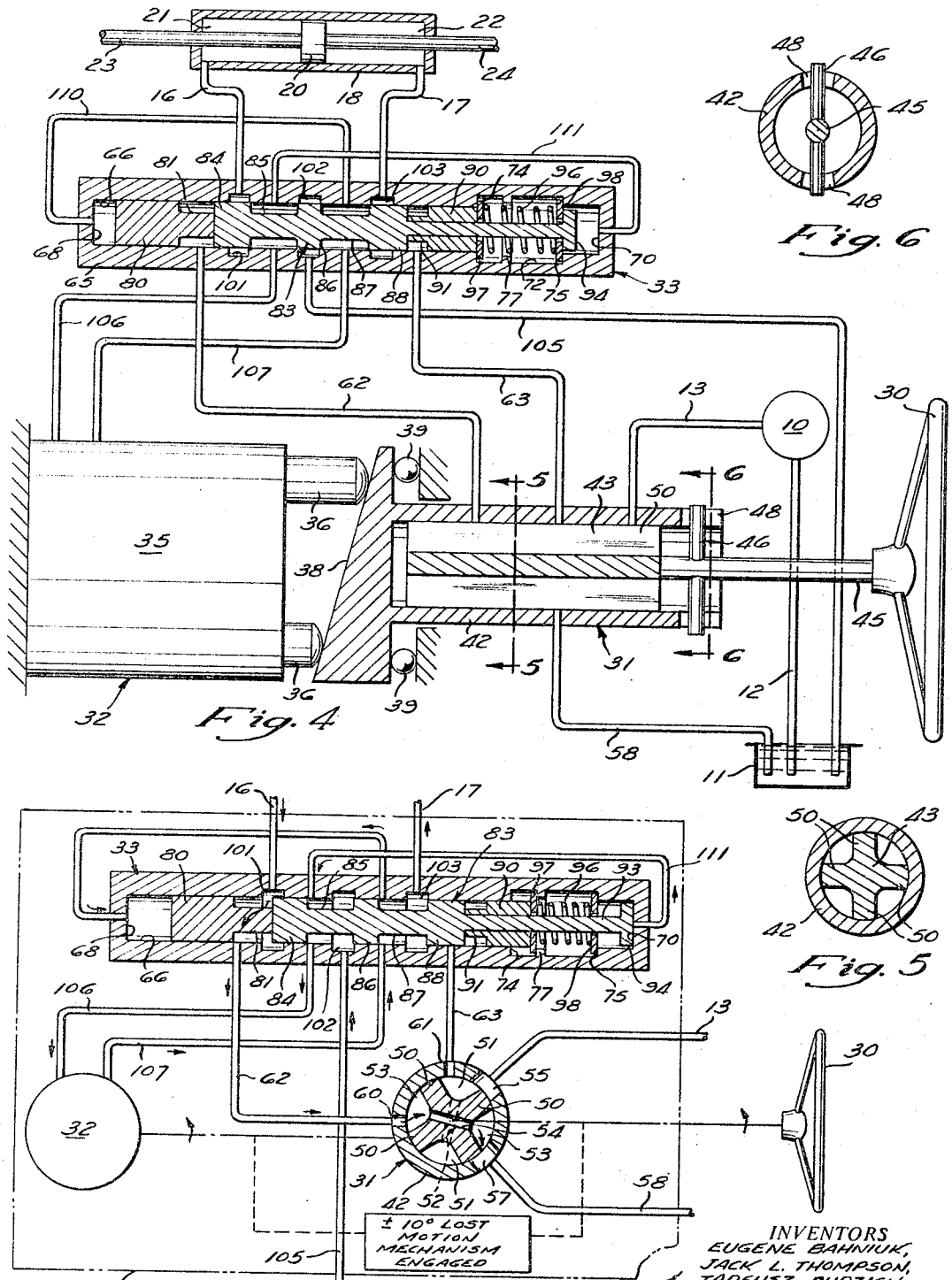

3,320,745
HYDRAULIC STEERING CONTROL
Eugene Bahniuk, Gates Mills, Tadeusz Budzich, Moreland Hills, and Jack L. Thompson, South Euclid, Ohio, assignors to The Weatherhead Company, Cleveland, Ohio, a corporation of Ohio
Filed Oct. 4, 1965, Ser. No. 492,819
16 Claims. (Cl. 60—52)

This invention relates generally to hydraulic control systems and more particularly to a hydraulic servo-type control system particularly adapted to provide a complete steering system for wheeled vehicles.

In recent years, the growth in size and power of wheeled vehicles, particularly off-the-road vehicles such as the types used for construction purposes, has required that the steering operation of such vehicles be given a power assist to aid the operator, since the forces necessary to steer the vehicle are so great as to cause rapid fatigue and loss of the precision control necessary in the operation of such vehicles.

One type of power steering system which has been proposed and used considerably, particularly in automotive vehicles, is to retain the normal manual steering linkage and use a source of hydraulic power such as a pump to operate an expansible chamber fluid motor connected to some portion of the steering linkage or steering gear mechanism. The hydraulic motor is actuated by means of a torque responsive valve to provide a follow-up action so as to allow the wheels to follow the movement of the steering wheel in a manner very similar to manually operated steering, but with greatly reduced effort by the operator.

However, the configuration of many vehicles makes the power assisted steering linkage undesirable because of the complexity and size of the linkage. It has been proposed in such cases that the mechanical linkage be eliminated and a hydraulic servo-control interposed so that there is no mechanical connection between the vehicle wheels and the steering wheel so that the steering wheel merely actuates a valve which controls the flow of fluid from the pump to an expansible chamber motor used to move the vehicle wheels. Systems of this type have been proposed but heretofore have raised a number of problems because of the lack of the mechanical linkage to provide a positive position responsive feedback. In order to give the operator proper feel it is necessary to provide some sort of feedback arrangement which will indicate whether or not the wheels have moved to the position determined by the movement of the steering wheel. Furthermore, because of the lack of any mechanical connection there may be a tendency of the wheels to wander as a result of leakage in the system, causing a drift of the vehicle wheels which in turn requires a continual corrective movement of the steering wheel to maintain the vehicle moving in the intended direction. Furthermore, it is necessary to make some provision to retain some form of manual steering in the event of a loss of hydraulic pressure or other failure in the supply system.

Therefore, it is a principal object of this invention to provide a novel hydraulic control system particularly adapted for control of the steerable wheels of a vehicle which has minimum internal leakage in operation to provide a minimum amount of wander or drift and requiring a minimum amount of corrective movement of the steering wheel.

It is a further object of this invention to provide a hydraulic control system as set forth in the preceding object which provides a precise feedback of the movement of the steerable wheels to the steering wheel to maintain a proper response and feel for the vehicle operator.

It is another object of this invention to provide a hydraulic control system as set forth in the preceding objects in which there is an automatic takeover by manual control in the event of a loss of hydraulic pressure to provide a manual steering action.

It is another object of this invention to provide a novel hydraulic steering system as set forth in the preceding object in which under manual control, the feedback motor acts as a pump to supply fluid from the reservoir to the actuator motor to insure the fluid supply during manual control conditions.

Still another object of this invention is to provide a hydraulic steering system as set forth in the preceding objects which is simple in construction to allow low cost manufacture while providing the high degree of reliability necessary for such systems.

Briefly, the foregoing is accomplished in the preferred embodiment of this invention by using a hydraulic pump as the fluid pressure supply and a piston and cylinder type of expansible chamber fluid motor connected to the steerable vehicle wheels. The vehicle steering wheel is used to actuate one member of an open center type of rotary valve to direct fluid from the pump to a condition selector shuttle valve which controls the fluid flow to the steering motor and directs the fluid from the steering motor to an axial piston expansible chamber fluid motor which rotates the other member of the rotary valve to provide a follow-up action. In addition, a lost motion mechanical connection is provided directly between the steering wheel and the feedback motor so that in the event of a loss of pressure, such as caused by failure of the pump, the feedback motor changes its mode of operation to become a pump, and by the change of mode of operation of the shuttle valve, the steering wheel pumps fluid by means of the feedback motor, now a pump, from the reservoir to the steering motor to move the vehicle steerable wheels.

Further objects and advantages of this invention will readily be apparent to those skilled in the art upon a more complete understanding of the preferred embodiment of the invention which is described in the following detailed description and shown in the accompanying drawings in which:

FIGURE 1 is a schematic showing of the hydraulic steering system according to the preferred embodiment of the invention under neutral steering conditions;

FIGURE 2 is a schematic partial view of the steering unit shown in FIGURE 1 under turn conditions;

FIGURE 3 is a view similar to FIGURE 2 but showing the system as arranged for manual steering operation in the absence of fluid supply from the pump;

FIGURE 4 is a partially schematic view of a portion of the steering unit showing the metering valve, feedback motor, and shuttle valve;

FIGURE 5 is a section through the metering valve taken on line 5—5 of FIGURE 4; and FIGURE 6 is a section through the lost motion connection taken on line 6—6 of FIGURE 4.

Referring now to the figures in greater detail, the general arrangement of the power steering system of the preferred embodiment of this invention is shown partially schematically in FIGURE 1. A hydraulic pump 10 has its inlet side connected to a fluid reservoir 11 through a line 12 and has its outlet side connected through a high pressure discharge line 13 to the steering unit which consists of the portion indicated within the box 15.

The steering unit 15 is connected by a pair of lines 16 and 17 to a steering motor cylinder 18 having a sliding piston 20 therein. The piston 20 as positioned to separate the interior of the cylinder into a pair of fluid motor chambers 21 and 22. On each side of the piston 20 are connected a pair of piston rods 23 and 24 which in turn are connected to the steerable vehicle wheels indicated at 25 and 26. It will be understood that this hydraulic motor assembly may be of any suitable type for moving one or more steerable wheels or other steering device such as a steering post in a reversible manner for steering the vehicle. For example, the two chambers 21 and 22 could be separate expansible chamber fluid motors arranged to pivot an axle about a center post, or alternatively, various other types of low leakage positive displacement fluid motors such as rotary actuators can also be used in a suitable arrangement for providing the necessary steering motion. Of course, since the particular construction of the fluid motor used does not, apart from the combination, form a part of this invention, further details of its structure and the arrangement for moving the steerable wheels will not be described in further detail.

The operator control of the steering system is by means of a conventional steering wheel 30, and the steering wheel is connected directly to one element of a rotary metering valve indicated generally in FIGURE 1 at 31. The other element of the rotary metering valve is rotated by a feedback motor 32, and the selective connections of fluid flow to the steering actuator motor cylinder 18 from the metering valve are made by means of the shuttle valve indicated generally at 33. The metering valve 31 is shown by way of example as being of the rotary type, and the steering wheel rotates the one portion of the valve and the feedback motor rotates the other member to return the metering valve to a neutral position indicating that the steerable vehicle wheels have moved through the requisite change in position determined by the movement of the steering wheel 30. In addition, as explained in greater detail hereinafter, a lost motion mechanical connection is provided directly between the steering wheel 30 and the feedback motor 32 so that in the event of failure of the hydraulic pump 10 or other failure in the fluid pressure supply system, the steering wheel 30 can drive the feedback motor as a pump and thereby manually pump fluid from the reservoir into one or the other of the fluid motor chambers 21 and 22 to allow manual steering of the vehicle.

Further structural details of the metering valve 31 and feedback motor 32 are shown in FIGURE 4, where it will be seen that the feedback motor 32 is of the axial piston positive displacement type which has the advantage of very low leakage as well as fast and precise response. The feedback motor is shown as having a cylinder block 35 having bores therein to receive pistons 36. At their outer ends, the pistons 36 act against an inclined cam plate 38 which is rotatably mounted within a suitable housing for the pump by means of the bearings indicated at 39. The cam plate 38 is arranged to rotate a sleeve member 42 of the metering valve, and within the sleeve 42 is mounted the inner valve member or spool 43, arranged to rotate relative to the sleeve 42.

The inner metering valve member or spool 43 is connected directly to the steering wheel 30 by means of a suitable steering shaft 45 which has, outward of the spool 43, a transverse pin or cross pin 46 which fits within a slot 48 on the sleeve 42. As shown in FIGURE 6, the slot 48 is given a width greater than the diameter of the cross pin 46 to allow a certain amount of free movement or lost motion between the pin and slot to provide the necessary lost motion between the steering wheel 30 and the feedback motor 32.

The valve member 43 is generally cruciform in shape to have four longitudinally extending passages spaced apart by four vanes 50 extending along the length of the valve spool. It will be understood that suitable sealing means, not shown, are provided at the ends of the spool 43 to prevent leakage at these points. The vanes 50 divide the inner valve spool 43 into opposed connected pairs of passages. The pair of passages 51 arranged vertically in FIGURE 1 are interconnected at all times by means of an interpassage 52 in the spool 43. Likewise, the horizontal pair of longitudinal passages 53 is interconnected at all times by a suitable connecting passage 54. Thus, it will be understood that at all times the pressures at all points of the opposed pair of connecting passages will be the same and the connecting passages have sufficient area to permit a free transfer of fluid between the opposed passages, depending upon the requirements of the fluid system.

As shown in the various figures, the sleeve 42 is provided with appropriately located ports to make the necessary fluid connections with the remainder of the system and thereby provide the necessary valving action. For example, the sleeve 42 has an inlet port 55 connected through the discharge line 13 to the pump 10. Spaced substantially 90° from the inlet port 55 is a drain port 57 connected through a suitable drain line 58 back to the reservoir 11. Also provided on the sleeve 42 are a pair of control ports 60 and 61 connected by the lines 62 and 63, respectively, to the shuttle valve 33 to supply thereto the fluid from the pump 10 determined by the relative position of the sleeve 42 and spool 43.

The shuttle valve 33 normally locks the steering actuator cylinder 18 by closing off the lines 16 and 17. However, when fluid is supplied to the shuttle valve 33 from one of the lines 62 or 63, the shuttle valve operates to direct the fluid to the correct one of the chambers 21 and 22 and directs the fluid exhausted from the other chamber to the feedback motor 32 and from the feedback motor 32 to drain.

While the above is the direction of flow during power steering conditions, a loss of fluid pressure to the metering valve 31 and the subsequent takeup of the lost motion connection causes the feedback motor 32 to operate as a pump and this changes the direction of fluid flow within the system. In this case, the feedback motor, now acting as a pump, pumps fluid from the reservoir to the shuttle valve which now operates to direct the fluid into the correct one of the steering actuating motor chambers 21 and 22, and then directs the fluid from the other one of the motor chambers back toward the metering valve where the fluid is then free to return to the reservoir through drain port 57 and drain line 58.

The shuttle valve 33 includes a housing 65 which may be part of the structure including the feedback motor and the metering valve, or alternatively, it may be a separate housing. Within the housing 65 is an axial bore 66 having closed ends 68 and 70. A spaced distance from the right end 70 is an enlarged cylindrical chamber 72 having shoulders 74 and 75 at each end where the diameter is reduced to that of the bore 66. Adjacent its midpoint, but closer to the left end 74, is a reduced annular shoulder 77 having a diameter less than that of the chamber 72, but slightly greater than that of the bore 66.

The valving operation is carried out by an arrangement of three separate valve spools which cooperate with ports opening into the bore 66 to direct the fluid through the proper lines. Thus, there is a left spool 80 having a main portion equal to the diameter of that of the bore 66 and adapted to come into abutting engagement with the left end 68 of the bore. This spool 80 on its right-hand end has a reduced diameter portion 81 which at its end abuts against the center spool 83. The center spool 83 is symmetrical in shape to have a left land 84 which is separated from the center land 86 by a groove 85. In turn, the center land 86 is spaced from the right-hand land 88 by another annular groove 87. The right-hand land 88 abuts against the reduced diameter 91 of the right-hand spool 90 whose main portion also has a diameter equal to that of the bore 66. The lands 84, 86, and 88 of the center spool 83 likewise are equal in diameter to the bore 66 so that fluid can flow out through the ports only when they are in alignment with either of the grooves 85 and 87 or the reduced portions 81 and 91.

To accomplish the necessary biasing to properly position the spools 80, 83, and 90 within the bore 66, the center spool 83 has a rod portion 93 extending through a closely fitting bore in the right-hand spool 90. The rod portion 93 terminates in an enlarged head 94 which is normally positioned within the right-hand end 90 of bore 66 outward of the enlarged chamber 72. Surrounding the rod portion 93 is a helical compression spring 96 which abuts at each end against washers 97 and 98. It will be seen from FIGURE 1 that normally the spring biases the washers 97 and 98 against the ends 74 and 75 of the enlarged chamber 72 and accordingly by their engagement against the right spool 90 and head 94, they positively position the center spool in a neutral position shown in FIGURE 1, as well as to hold the right-hand spool 90 in engagement against the center spool.

To cooperate with the lands and grooves on the spools, the housing 65 has left, center and right-hand annular grooves 101, 102 and 103, respectively, having a diameter greater than that of the bore 66. These grooves 101, 102 and 103 are positioned along the bore so that when the center spool 83 is biased to its center position as shown in FIGURE 1, they will be in alignment with the lands 84, 86, and 88 of the center spool so these lands seal off the grooves and prevent fluid flow in the lines connected to them. Accordingly, the left groove 101 is connected by means of the left line 16 to the left chamber 21 of the actuating cylinder 18. Likewise the right groove 103 is connected by line 17 to the right chamber 22 so that in a neutral position these lines 16 and 17 are blocked off and the vehicle wheels will remain locked in position. A drain line 105 is connected to the center groove 102 and serves to return fluid to the reservoir 11.

The supply of fluid to the shuttle valve from the metering valve comes through either of the lines 62 and 63 which open into the bore 66 opposite the reduced portions 81 and 91 of the left and right spools and outward of the ends of the center spool 83 when the latter is in the intermediate position. The feedback motor 32 is connected to lines 106 and 107 which open into the bore 66 opposite the left and right grooves 85 and 87 on the center spool 83. It will be understood that the feedback motor incorporates suitable valving to insure that it rotates in the proper direction to provide the necessary feedback action depending upon the movement of the piston 20 within the steering actuator cylinder 18. To complete the fluid circuits associated with the shuttle valve 33, a line 110 opens into the bore 66 opposite the right groove 87 of the center spool and extends to the left end 68 of bore 66 to supply fluid to that end of the cylinder for purposes of forcing the left spool in the right-hand direction. Likewise, a second line 111 opens into the bore 66 opposite the left groove 85 of the center spool and extends to the right end 70 of bore 66 so as to be able to shift the right spool 90 toward the left.

Turning now to the operation of the system, the metering valve 31 is of the open-center type so that the fluid entering through line 13 from the pump 10 to the inlet port 55 will be free to flow into both of the passage pairs 51 and 53 and hence out through the drain port 57 through line 58 to the reservoir. Because of this unrestricted flow, there will be no pressure build-up in line 13 and no fluid will flow through either of the lines 62 or 63 to the shuttle valve 33. Within the shuttle valve 33, the spring 96 serves to bias the washers 97 and 98 against the respective ends 74 and 75 of the chamber 32. Thus, the right washer 98 engages the head 94 of rod 93 to prevent the center spool 83 from moving to the left of the neutral position, while the left washer 97 engages the right-hand end of the right spool 90 and forces its reduced portion 91 against the right-hand end of the center valve spool 83 to positively position this center spool in the middle or neutral position. As previously stated, the lands 84 and 88 block off the grooves 101 and 103 so as to positively prevent any fluid flow through the lines 16 or 17 and thereby the piston 20 is locked in position within the cylinder 18 so that the wheels 25 and 26 will be maintained in the desired position.

When the steering wheel 30 is moved toward the right to move the vehicle wheels 25 and 26 in that direction, the result, as shown in FIGURE 2, will be to rotate the inner metering valve member 43 toward the right so that the passages 61 will be cut off from the drain port 57 and the passages 53 will be cut off from the inlet port 55. This serves to connect the line 62 to drain and supply fluid pressure to the line 63. The fluid in line 63 thus flows into the shuttle valve 33 adjacent the reduced portion 91 of the right spool 90. The fluid force then acting on the effective area of the right spool 90 shifts that spool toward the right so that the washer 97 moves into engagement with the annular shoulder 77 to limit further movement of the right spool 90 in that direction. Likewise, the fluid pressure acting on the center spool 83 shifts that spool and the left spool 80 toward the left. This causes the rod head 94, engaging the right washer 98, to also compress the spring 96, but movement of the center spool 83 in this direction is limited by the abutment of the left spool 80 against the left end 68 of the bore 66. To allow this movement of the left spool 80, any fluid present is allowed to flow through the line 110 back to the right spool groove 87 which is now in communication with the center bore groove 102 to allow this fluid to pass through the drain line 105 to the reservoir 11.

In this position, the right land 88 of the center spool has moved a sufficient distance to bring the right-hand bore groove 103 into communication with the line 63 so that the full amount of fluid entering the shuttle valve through the line 63 may flow through the line 17 to the right chamber 22 of the steering actuator cylinder 18. As long as this flow continues, the piston 20 is moved toward the left, as shown in FIGURE 1, to move the wheels 25 and 26 in the direction of a right turn. At the same time the fluid in the left chamber 21 is allowed to drain through the line 16 to the left bore groove 101 which is in communication with the left spool groove 85. A small portion of the fluid then flows through line 111 back to the right end 70 of the axial bore to maintain this space filled and compensate for the movement of the spools. However, after this has taken place, the remainder of the fluid from chamber 21 flows through the line 106 to the feedback motor 32. This fluid flow causes the feedback motor to rotate in a follow-up manner to rotate the outer or sleeve member 42 of the metering valve in a direction tending to return the valve members to a neutral position. The exhaust or drain fluid from the feedback motor 32 then flows through the line 107 or it makes communications through the right groove 87 of center spool 83 to the center bore groove 102 from which it flows to the reservoir 11 through the line 105.

It will be understood that since the amount of fluid bing drained from the chamber 21 is equal in volume to that entering the chamber 22, the feedback motor 32 will rotate the correct distance to return the metering valve members to the neutral position determined by the rotation of the wheel 30. Of course, this action takes place so rapidly that the actual relative displacement of the two metering valve members is less than that allowed by the lost-motion connection between the feedback motor and the steering wheel so that during operation the wheels are moved at the corresponding rate of speed of the steering wheel 30 and when the steering wheel 30 is moved to a new position, only a slight amount of additional rotation of the feedback motor 32 is required to restore the members of the metering valve to the neutral position.

When the metering valve 30 returns to the neutral position, there will no longer be any fluid under pressure supplied to the line 63 so that the spools in the shuttle valve will return to the neutral position in FIGURE 1. Likewise in the case of a left turn, the center spool 83 will move to a right position because of the fluid flow through the line 62 and this will cause the directions of fluid flow to be reversed to produce the corresponding mode of operation for a left turn as described above in connection with a right-hand turn.

As previously stated, this steering system makes provision for operation in the event of a failure in the source of supply of fluid pressure to the metering valve through the line 13. Of course, this may take place either because of failure of the pump 10 or its prime mover or a rupture in the line 13. In such case, again in the case of a right turn, the system operates as shown in FIGURE 3.

Since there is no fluid pressure supplied to the metering valve, initial rotation of the steering wheel 30 provides no supply of fluid through the line 63 to the shuttle valve, and accordingly the valve spools will remain in a center or neutral position. However, sufficient rotation of the steering wheel 30 will take up the free movement allowed in the lost-motion connection and by the engagement of the pin 46 with the slot 48 will manually rotate the sleeve 42 and hence the cam plate 38. This causes the feedback motor 32 to be driven as a pump rather than as a motor. Therefore, actuation of the feedback motor 32 as a pump will tend to pump fluid under pressure out of line 107 while requiring a supply of fluid to the input line 106. Since under power conditions the fluid supply was from the steering actuator motor and fluid output was to drain, this requires a different mode of operation so that the outlet of the feedback of the shuttle valve is supplied to the steering motor rather than to drain. This is accomplished in the absence of a supply of high pressure fluid by the operation of the lines 110 and 111. With the system in the neutral position shown in FIGURE 1, the feedback motor 32 is connected in a closed circuit so that the line 106 is connected through the left center spool groove 85 to line 111 which in turn is connected to the right hand end 70 of the axial bore 66. Likewise, the other line from the feedback motor 32 is connected to the right center spool groove 87 to line 110 and hence to the left end 68 of the bore 66. Operation of the feedback motor as a pump will then force fluid outward through 107 and thus into the end 68 of the bore so that the three valve spools 80, 83, and 90 are forced to the right. The fluid for this is therefore taken from the right end 70 of the bore through the line 111 to line 106 and because these volumes are equal, the movement of the valve spools will be immediately responsive and will require little movement of the steering wheel because of the relatively low volumes required so that the operator in effect has no feel of any lost motion caused by the shifting of the spools.

When the spools have shifted toward the right-hand position as shown in FIGURE 3, they have done so against the bias of the spring 96 acting on the washer 97 which is in abutting engagement with the outer end of the right spool 90. This washer 97 engages the annular shoulder 77 to provide a positive stop to position the three spools as a unit in this right-hand position. When this is done, the intake line 106 is supplied with fluid through the left center spool groove 85 from the center groove 102 and the drain line 105 so that there is a reversal of flow in the main line 105 which now acts as a supply line to the feedback motor 32. The outlet through the line 107 is now connected through the right center spool groove 87 to the right bore groove 103 and hence directly to the line 17 for a supply to the chamber 22. The fluid required to be drained from the other chamber 21 flows through the line 16 back to the left groove 101 and then around the reduced portion 81 of the left spool to the line 62. The line 62 leads to the metering valve, which in this condition will be set up to allow the passages 53, now connected to port 60, to be connected to the drain port 57 so that all of the fluid removed from the chamber 21 will return to the reservoir 11 through the line 58.

It will be seen that under the manual steering conditions, since a positive displacement motor is being supplied with fluid by a positive displacement pump, the movement of the steering wheels will be directly proportional to the movement of the steering wheel 30 after the lost motion has been taken up. Because of the low leakage characteristics of the axial piston unit, the feedback motor has a high degree of precision operation as both a feedback motor and as a pump and the system has the minimum of wander or drift which would require constant correction by the operator. The takeover of manual control in the absence of fluid pressure is automatic and does not substantially change the steering characteristics apart from the amount of effort necessary to be applied to the steering wheel 30.

Where the preferred embodiment of this invention has been shown and described here and above in detail, it is recognized that upon a full understanding of this invention various modifications and rearrangements will occur to those skilled in the art and may be resorted to without departing from the scope of the invention as defined in the claims.

What is claimed is:

1. A hydraulic system comprising an actuator motor adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide follow-up rotation for said input shaft, and a condition selector valve interconnecting said metering valve and said actuator motor and said feedback motor, said selector valve being selectively operable responsive to fluid pressure from said metering valve to direct fluid from said metering valve to said actuator motor and from said actuator motor to said feedback motor and from said feedback motor to said reservoir.

2. A hydraulic system comprising an actuator motor adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide follow-up rotation for said input shaft, and a condition selector valve interconnecting said metering valve and said actuator motor and said feedback motor, said selector valve being selectively operable responsive to fluid pressure from said metering valve to direct fluid from said metering valve to said actuator motor and from said actuator motor to said feedback motor and from said feedback motor to said reservoir, said condition selector valve being operable in the absence of fluid pressure from said metering valve to directly interconnect said feedback motor and said actuator motor to allow said feedback motor to operate as a pump to operate said actuator motor.

3. A hydraulic system as set forth in claim 2 wherein said feedback motor is operably connected to said input shaft by a lost motion connection allowing sufficient relative movement to operate said metering valve and allowing torque applied to said input shaft to positively operate said feedback motor as a pump in the absence of fluid pressure at said metering valve.

4. A hydraulic system comprising an actuator motor adapted to be selectively connected to a source of fluid pressure for reversible actuation, a rotatable input shaft, a source of fluid pressure, a reservoir, an open center metering valve operable by said input shaft and having an inlet port, first and second outlet ports and a drain port, said valve being selectively operable to disconnect said inlet port from said drain port and to one of said first and second outlet ports, a reversible positive displacement feedback motor operable to provide a follow-up rotation for said input shaft, and a condition selector valve interconnecting said metering valve and said actuator motor and said feedback motor, said selector valve being selectively operable responsive to fluid pressure from said metering valve to direct fluid from said metering valve to said actuator motor and from said actuator motor to said feedback motor and from said feedback motor to said reservoir, said condition selector valve being operable in the absence of fluid pressure at said metering valve inlet port to directly interconnect said feedback motor and said actuator motor to allow said feedback motor to operate as a pump to operate said actuator motor.

5. A hydraulic system comprising an actuator motor adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, and a condition selector valve interconnecting said metering valve and said actuator motor and said feedback motor, said selector valve being operable responsive to fluid pressure from said metering valve to connect said actuator motor and said feedback motor in series between said metering valve and said reservoir, said condition selector valve being operable in the absence of fluid pressure from said metering valve to connect said actuator motor and said feedback motor in series to allow said feedback motor to operate as a pump to operate said actuator motor.

6. A hydraulic system comprising an actuator motor adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, an axial piston feedback motor having a plurality of pistons operable to rotate a cam plate, a lost motion connection between said cam plate and said input shaft arranged to allow limited relative rotation between said cam plate and said input shaft to allow said input shaft to actuate said metering valve, and a condition selector valve interconnecting said metering valve and said actuator motor and said feedback motor, said selector valve being operable responsive to fluid pressure from said metering valve to direct fluid from said metering valve to said actuator motor and from said actuator motor to said feedback motor and from said feedback motor to said reservoir, said condition selector valve being operable in the absence of fluid pressure from said metering valve to directly interconnect said feedback motor and said actuator motor to allow said feedback motor to operate as a pump to operate said actuator motor.

7. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, and a condition selector valve interconnecting said metering valve and said steering actuator motor and said feedback motor, said selector valve being operable responsive to fluid pressure from said metering valve by fluid pressure from said metering valve to direct fluid from said metering valve to said actuator motor and from said actuator motor to said feedback motor and from said feedback motor to said reservoir, said condition selector valve being normally operable to lock said steering actuator motor to prevent fluid flow to and from said first and second fluid chambers.

8. A hydraulic steering system comprising a steering actuator motor having first and second fluid chambers adaped to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, and a condition selector valve interconnecting said metering valve and said steering actuator motor and said feedback motor, said selector valve being operable by fluid pressure from said metering valve to direct fluid from said metering valve to said actuator motor and from said actuator motor to said feedback motor and from said feedback motor to said reservoir responsive to fluid pressure from said metering valve, said condition selector valve being operable in another condition in the absence of fluid pressure from said metering valve to connect said feedback motor and said steering actuator motor to allow said feedback motor to operate as a pump to operate said actuator motor, said condition selector valve being normally operable to lock said steering actuator motor to prevent fluid flow to and from said first and second fluid chambers.

9. A hydraulic steering system comprising a steering actuator motor having first and second fluid chambers adaped to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, a lost motion connection operable to allow said input shaft to drive said feedback motor as a pump, and a condition selector valve interconnecting said metering valve and said steering actuator motor and said feedback motor, said selector valve being operable in one condition by fluid pressure from said metering valve to connect said feedback motor and said actuator motor in series between said metering valve and said reservoir to allow fluid from said metering valve to operate said actuator motor and said feedback motor to follow the rotation of said input shaft, said condition selector valve being operable in another condition by fluid pressure from said feedback motor to connect said feedback motor and said steering actuator motor to allow said feedback motor to operate as a pump driven by said input shaft to operate said actuator motor.

10. A hydraulic steering system comprising a steering actuator motor having first and second fluid chambers adaped to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, a lost motion connection operable to allow said input shaft to drive said feedback motor as pump, and a condition selector valve interconnecting said metering valve and said steering actuator motor and said feedback motor, said selector valve being operable in one condition by fluid pressure from said metering valve to connect said feedback motor and said actuator motor in series between said metering valve and said reservoir to allow fluid from said metering valve to operate said actuator motor and said feedback motor to follow the rotation of said input shaft, said condition selector valve being operable in another condition by fluid pressure from said feedback motor to connect said feedback motor and said steering actuator motor to allow said feedback motor to operate as a pump driven by said input shaft to operate said actuator motor, said condition selector valve being operable in a third condition in the absence of fluid pressure to lock said steering actuator motor to prevent fluid flow to and from said first and second fluid chambers.

11. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve operable by said input shaft having first and second outlet ports and operable to selectively connect said fluid pressure source to said first and second outlet ports, an axial piston feedback motor having a plurality of pistons operable to rotate a cam plate, a lost motion connection between said cam plate and said input shaft, and passage means connecting said metering valve and said steering actuator motor and said feedback motor to direct fluid flow from said metering valve through said feedback motor and said actuator motor to said reservoir whereby said feedback motor provides a follow-up rotation to said input shaft proportional to the movement of said output member.

12. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve operable by said input shaft having first and second outlet ports and operable to selectively connect said fluid pressure source to said first and second outlet ports, an axial piston feedback motor having a plurality of pistons operable to rotate a cam plate, a lost motion connection between said cam plate and said input shaft, and passage and condition responsive control valve means connecting said metering valve and said steering actuator motor and said feedback motor in series to direct fluid flow from said metering valve first through said actuator motor and then through said feedback motor to said reservoir whereby said feedback motor provides a follow-up rotation to said input shaft proportional to the volume of fluid flowing from said actuator motor to said feedback motor.

13. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve having first and second relatively movable members, one of said members being movable by said input shaft, said metering valve having first and second outlet ports and operable to selectively connect said fluid pressure source to said first and second outlet ports, an axial piston feedback motor having a plurality of pistons operable to rotate a cam plate, said cam plate being operable to move the other of said metering valve members, a lost motion connection between said cam plate and said input shaft, and passage means connecting said metering valve and said steering actuator motor and said feedback motor to direct fluid flow from said metering valve through said feedback motor and said actuator motor to said reservoir whereby said feedback motor provides a follow-up rotation to said input shaft proportional to the movement of said output member.

14. A hydraulic steering system comprising a positive displacement steering actuator motor adapted to be selectively connected to a source of fluid pressure for reversible actuation, a rotatable input shaft, a source of fluid pressure, a reservoir, a metering valve having first and second outlet ports and operable to selectively connect said fluid pressure source to said first and second ports, a positive displacement feedback motor operable to rotate said input shaft in a follow-up motion, a lost motion connection operable to allow said input shaft to drive said feedback motor as a pump, and a condition selector valve interconnecting said metering valve and said actuator motor and said feedback motor with said reservoir, said selector valve comprising a housing having an axial bore therein, a plurality of valve spools in said bore, means normally biasing said valve spools toward a center position, fluid pressure means operable responsive to fluid flow from said metering valve to shift at least two of said valve spools together as a unit in one direction along said bore to thereby connect in series said metering valve to said actuator motor and said actuator motor to said feedback motor and said feedback motor to said reservoir to operate said actuator motor and to operate said feedback motor to follow the rotation of said input shaft, and means operable in the absence of fluid pressure from said metering valve responsive to fluid pressure from said feedback motor being operated as a pump to shift said plurality of valve spools as a unit away from said center position to allow said feedback motor to pump fluid flow from said reservoir to said actuator motor.

15. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve having first and second outlet ports and operable to selectively connect said fluid pressure source to said first and second ports, a positive displacement feedback motor operable to rotate said input shaft in a follow-up motion, a lost motion connection operable to allow said input shaft to drive said feedback motor as a pump, and a condition selector valve interconnecting said metering valve and said actuator motor and said feedback motor with said reservoir, said selector valve comprising a housing having an axial bore therein, a plurality of valve spools in said bore, means normally biasing at least one of said valve spools toward a center position to lock said steering actuator motor to prevent fluid flow to and from said actuator motor, fluid pressure means operable responsive to fluid flow from said metering valve to shift at least two of said valve spools together as a unit in one direction along said bore to thereby connect in series said metering valve to said actuator motor and said actuator motor to said feedback motor and said feedback motor to said reservoir to operate said actuator motor to drive said output member and to operate said feedback motor to follow the rotation of said input shaft, and means operable in the absence of fluid pressure from said metering valve responsive to fluid pressure from said feedback motor being operated as a pump to shift said plurality of valve spools as a unit away from said center position to allow said feedback motor to pump fluid from said reservoir to said actuator motor and allow fluid from said actuator motor to flow back to said reservoir through said metering valve.

16. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve having first and second relatively movable members, one of said members being movable by said input shaft, said metering valve having first and second outlet ports and operable to selectively connect said fluid pressure source to said first and second ports responsive to the relative movement of said first and second members, an axial piston feedback motor having a plurality of pistons operable to rotate a cam plate, said cam plate being operable to move the other of said metering valve members in a follow-up motion, a lost motion connection between said cam plate and said input shaft to allow said input shaft to drive said feedback motor as a pump, and a condition selector valve interconnecting said metering valve and said steering actuator motor and said feedback motor with said reservoir, said selector valve comprising a housing having an axial bore therein, a plurality of valve spools in said bore, means normally biasing at least one of said valve spools toward a center position to lock said steering actuator motor to prevent fluid flow to and from said actuator motor, fluid pressure means operable responsive to fluid flow from said metering valve to shift at least two of said valve spools together as a unit in one direction along said bore to thereby connect in series said metering valve to said actuator motor and said actuator motor to said feedback motor and said feedback motor to said reservoir to operate said actuator motor to drive said output member and to operate said feedback motor to follow the rotation of said input shaft, and means operable in the absence of fluid pressure from said metering valve responsive to fluid pressure from said feedback motor being operated as a pump to shift said plurality of valve spools as a unit away from said center position to allow said feedback motor to pump fluid from said reservoir to said actuator motor.

No references cited.

EDGAR W. GEOGHEGAN, *Primary Examiner.*